United States Patent [19]

Braker et al.

[11] 4,072,553
[45] Feb. 7, 1978

[54] APPARATUS CONTROLLING SHRINKAGE OF A SLEEVE WRAP ON A CONTAINER

[75] Inventors: Frederick Williams Braker, Toledo; Russell William Heckman, Perrysburg; George Allen Nickey, Toledo; Terry Clair Potter, Sylvania, all of Ohio

[73] Assignee: Owens-Illinois, Inc., Toledo, Ohio

[21] Appl. No.: 672,227

[22] Filed: Mar. 31, 1976

[51] Int. Cl.² .......................... B29D 3/00; B65B 53/06
[52] U.S. Cl. ................................... 156/423; 53/30 S; 156/86; 156/499; 156/567
[58] Field of Search ................. 156/86, 423, 446, 447, 156/458, 499, 538, 556, 558, 566, 567; 53/30 S

[56] References Cited

U.S. PATENT DOCUMENTS

| | | | |
|---|---|---|---|
| 3,235,433 | 2/1966 | Cuacho et al. | 156/446 |
| 3,367,822 | 2/1968 | Hoffler | 156/567 |
| 3,707,417 | 12/1972 | Dullinger | 156/447 |
| 3,760,968 | 9/1973 | Amberg | 156/86 |
| 3,802,942 | 4/1974 | Amberg et al. | 156/86 |
| 3,959,065 | 5/1976 | Ashcroft | 156/86 |

Primary Examiner—Caleb Weston
Attorney, Agent, or Firm—John R. Nelson

[57] ABSTRACT

An apparatus for forming a smooth, even, substantially encapsulating layer of a heat shrinkable polyolefin plastic on a glass container. The body of the container is substantially greater in diameter compared with the neck. A cylindrical sleeve of polyolefin is telescopically placed along the outer surface of the container and the two are conveyed together into a heating oven for shrinking the sleeve snugly over the container. During heating, the polyolefin initially softens and becomes limp such that the sleeve tends to fold over or upon shrinking creates wavy top margins on the shrunken covering. The apparatus provides controlled rotation of the bottle and sleeve in the oven to apply a centrifugal force to the limp plastic which remains erect and billowed outwardly to give the material time to react with the heat such that the sleeve material shrinks into overall even, snug contact about the contour of the container without folds and wrinkles. By way of example, using 14-15 mil foam polyethylene sleeve on the order of 4-5 inch diameter over a bottle having a body diameter 4-5 inch and neck diameter 1-2 inch, the foam being pre-oriented in machine direction (sleeve circumference) 60-80% and cross dimension 0-15% is subjected to a bottle rotation in the range of 150-300 RPM while immersed in the oven heated by hot air at a ware production rate (speed) of 100-250 BPM.

9 Claims, 7 Drawing Figures

APPARATUS CONTROLLING SHRINKAGE OF A SLEEVE WRAP ON A CONTAINER

The present invention relates to manufacture of plastic shrink wrap coverings on glass containers of the type disclosed in U.S. Pat. No. 3,760,968; and particularly of the type disclosed on FIG. 14 of said patent.

BACKGROUND OF THE INVENTION

The process of our copending application, Ser. No. 672,229 filed Mar. 31, 1976, U.S. Pat. No. 4,016,706, entitled "Method of Controlling Shrinkage of a Sleeve Wrap on a Container" provides a need for a production machine to produce the plastic encapsulated bottles provided with shrunken sleeves of heat shrinkable polyolefin type material.

SUMMARY OF THE INVENTION

In the present invention, a machine is provided for heat shrinking sleeves of plastic onto a form, such as a bottle, so as to substantially cover the exterior thereof. The invention includes a controlled rotation of the bottle and the sleeve telescopically applied thereon about the central axis of the bottle during heating such that the sleeve will shrink uniformly over the adjacent area of the bottle. The controlled bottle rotation diminishes wavy or folded tops of the sleeves being shrunken on the bottle.

The chuck on the conveyor carrying the bottle is rotatable about the common central axis of the two. As the bottle and sleeve enter the oven, the chuck is rotated such that the rotational speed of the bottle about its axis will be regulated relative to line speed, shrink temperature, shrink dimension and properties of the material. The controlled bottle rotation establishes a centrifugal force on the sleeve as the material undergoes its initial heating in the oven and the sleeve remains substantially erect and billowed while the material has time to heat further so that it progressively shrinks. The shrinkage will progress upon further heating by the sleeve first engaging the larger diameter portion of the bottle and progressively snugly shrinking over the remainder of the bottle surface until the smallest diameter portion is snugly and evenly engaged by the contracting sleeve. The machine produces sleeve wrapped bottles of this type in which the defects of folds in the sleeve or wavy top margins are avoided. The centrifugal force component provided by controlled bottle rotation (150–200 RPM) in the apparatus maintains the material of the sleeve opposite any of the smaller diameter portions of the bottle billowed out to give the resin time to react with the heat supplied by the oven and shrink into place evenly and without wavy tops or wrinkles.

Other advantages and features of the invention will be more readily apparent to those skilled in the art from the following detailed description of the drawings, which illustrate an apparatus for carrying out the method of the invention, on which:

DESCRIPTION OF THE INVENTION

Figure 1:
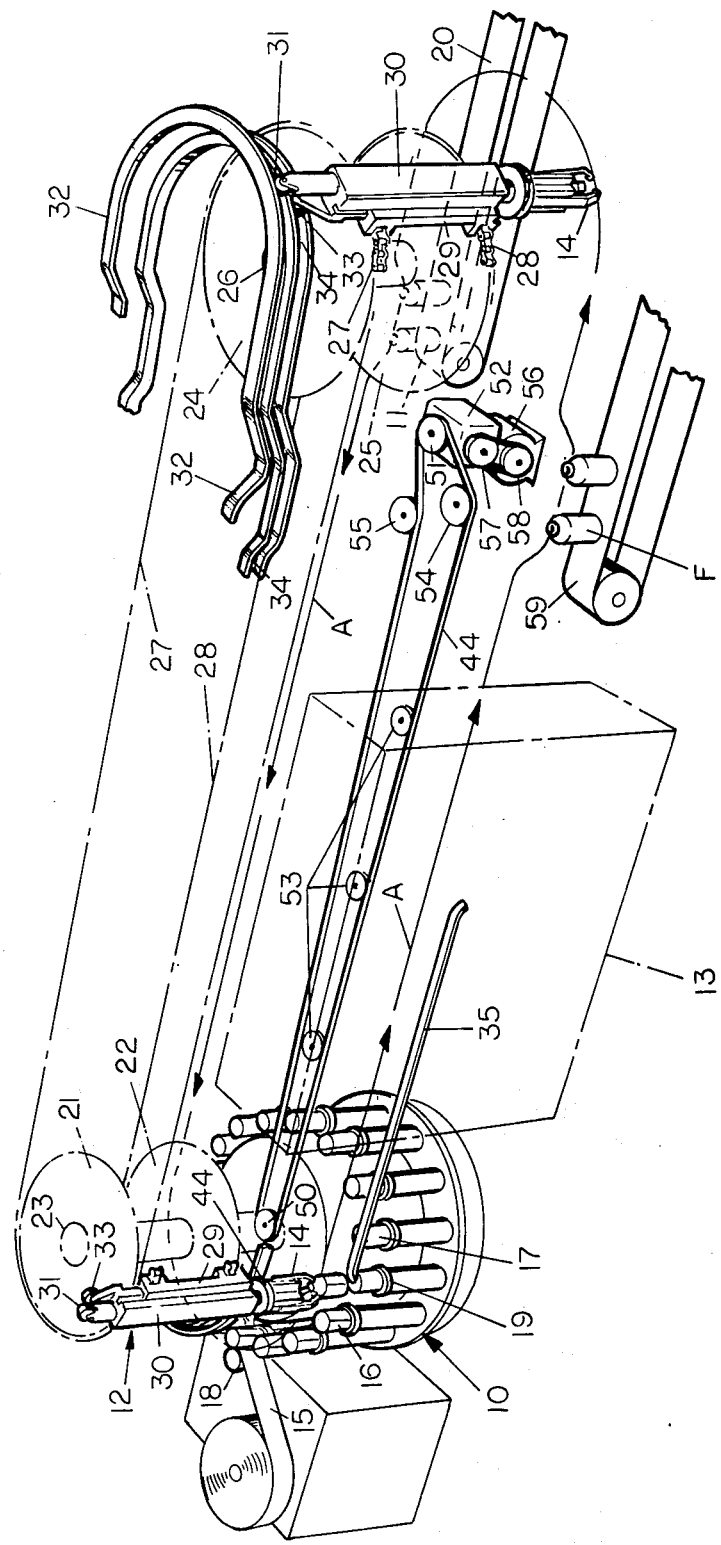
FIG. 1 is a three-quarter side perspective view, in part schematic, showing the machinery and process for making a plastic wrapped bottle, and including the apparatus of this invention.

Shown on FIG. 1 is a machine for producing plastic sleeves on a turret machine 10, assembling them telescopically over glass bottles 11 carried by the conveyor 12 and shrinking them thereon in a heating apparatus 13. The glass bottles in the example of the present disclosure, after having a shrunken plastic covering thereon, form a plastic wrapped container of a type described and shown in the above mentioned U.S. Pat. No. 3,760,968, as shown on FIG. 14, thereof.

Again referring to FIG. 1, in production of these containers, glass bottles 11 are picked up by the neck chucks 14 spaced along the endless bottle conveyor 12 and carried through over 13, indicated generally in phantom outline on FIG. 1. After receiving a sleeve of the plastic material herein described, the conveyor path extends through the length of the oven chamber which is operated as a hot air chamber kept at elevated temperature by radiant heaters of sufficient magnitude for shrinking the plastic cylinder-like sleeve onto the bottle.

The plastic material used is a polyolefin or copolymers of olefins, for example polyethylene, or laminates of polyolefins, e.q. polyethylene foam layer and polyethylene film or a polystyrene foam and ethylene ethyl acrylate film.

The plastic material of the polyolefin foam is made in sheet that is highly oriented in the longitudinal dimension (M direction) of the web which is to become the circumference of the sleeve. There may be some orientation in the cross dimension of the web (T direction); however, this should be minimal in relation to the M direction orientation, because this T direction is ultimately the height dimension of the sleeve and it is desirable to control the top margin of the wrap level and at a line along the bottle.

Examples of plastic sheet material that may be run in a web 15 are foamed polyethylene on the order of 0.010–0.020 inch thickness and highly oriented in the running (M) direction of web 15. M direction orientation for shrinkage should be at least 30% and on the order of 60–80% is preferred. The cross (T) direction orientation should be less than 15% and in the range 0–15%.

In a more general way, the plastic sheet material may be a form of a contractible polyolefin or copolymer of olefins with vinyl esters, for example, vinyl acetate, or with alpha, beta, monoethylenically unsaturated acids, such as ethyl acrylate or ethylene ethyl acrylate. The plastic is preferably in form of a foam sheet or a foam/film laminate sheet, but the principles of the invention will also work with non-foam materials or solid sheet.

The general properties of the described materials in contraction (shrinking) is to achieve upon heating a first pliable, plastic state (a very limp condition) at which time the sheet material tends to sag, slump or fold, and this is followed after additional heating rather suddenly by a shrinkage reaction.

In assembly of the plastic sleeve onto a bottle, the inner circumference of sleeve 16 is just slightly more than the exterior circumference of the bottle 11 at its largest portion, usually the body portion, so that the sleeve may be telescopically assembled over bottle 11 to the proper elevation on the latter.

Figure 3:
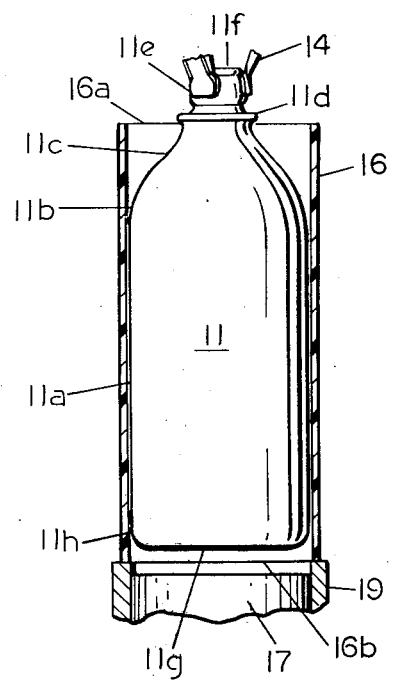
FIG. 3 is an end view, partly in section, of the bottle receiving the sleeve of heat shrinkable plastic from a mandrel device of the sleeve making apparatus.

Referring again to FIG. 1, the web 15 of plastic sheet is mounted in a roll supply and unwound to a feed drum 18 which cuts the web into lengths for forming the sleeves 16 (FIG. 3). The feed drum, in turn, feeds each of the cut lengths of the plastic to a mandrel 17 on the turret machine 10. These components are more specifically shown and described in U.S. Pat. No. 3,802,942.

Once the plastic is on the mandrel 17 and wound around it so that the ends of the plastic overlap, a heated seal bar (not shown herein) of the turret machine 10 presses the overlapped plastic into a heat bonded, vertical seam securing the ends and making a substantially cylindrical sleeve 16. A stripper device 19 is shifted along mandrel 17 which transfers the plastic sleeve onto the overhead bottle 11.

Figure 4:
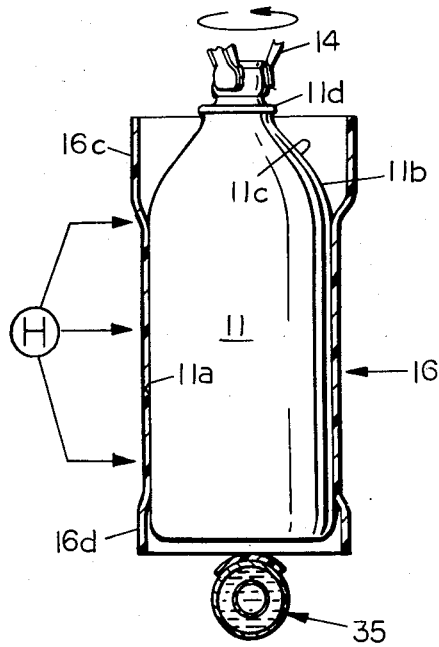
FIG. 4 is the first in a sequence of end views of the bottle and sleeve in which the plastic sleeve is undergoing shrinking in an oven under the utilization of the invention.

Bottles 11 are loaded from an infeed conveyor 20 to the chucks 14 of the endless conveyor 12. The conveyor path is described at one end by the two end gears 21 and 22 on shaft 23 that is coaxial with the center shaft of turret machine 10, and at the other end by the two gears 24 and 25 which rotate about shaft 26. The conveyor 12 is made up of chains 27 and 28 reeved on the end gears 23, 24 and 22, 25, respectively. The bottle chucks 14 pick up the bottles at the loading station over bottle infeed conveyor 20 and are carried as parts of the assembly of the conveyor 12. Included on the conveyor are carriage brackets carried by the chains 27, 28 along which the cylinder assembly 30 is slidably mounted. The height elevation of the chucks 14 in the conveyor path is controlled by a cam roller 31 which operates on the upper cam track 32. The opening and closing movement of the jaws of chuck 14 are controlled by cam roller 33 running in the cam track 34. Thusly, the bottles 11 are picked up in succession by the bottle conveyor and carried in the path A indicated by the line and arrows on FIG. 1. This path includes a registration of each bottle with an underlying sleeve of the plastic material which is pushed upwardly by stripper 19 over the bottle. The bottle with sleeve thereon next proceeds to oven 13 to be heated and processed in accordance with the present invention. As the sleeve 16 reaches its assembled height on bottle 11, the conveyor path A extends along a watercooled sleeve support bar 35 which extends from adjacent the mandrel path on turret machine 10 well into the oven 13. The structural details of support bar 35 is disclosed in copending application Ser. No. 658,631 filed Feb. 17, 1976, U.S. Pat. No 4,012,271, owned by a common assignee with the present application. The support bar 35 will assure the elevation of the sleeve on the bottle at least until such time as shrinkage of a degree similar to that illustrated on FIG. 4 is achieved in the oven 13. In this state, the contractible sleeve has shrunken to engage at least an annular portion of the major body (large diameter) of bottle 11 to hold the sleeve in place during the balance of the process.

The bottle 11, illustrated on FIGS. 2–7, is typical of carbonated beverage bottles in use today. Referring to the bottle on FIG. 3, which is the same as shown on the other Figures, it includes a major diameter body portion 11a, a rounded shoulder portion 11b at the upper end of the body which merges into the minor diameter neck portion 11c. The neck 11c may, as is illustrated, include a carrying ring 11d molded in the glass. Above ring 11d the neck merges into the bottle finish 11e which includes an annular rim 11f at the top of the bottle defining the opening or mouth for filling and pouring. At the other end of bottle 11, the side wall of body 11a merges into the bottom wall 11g at the corner radius or heel portion 11h. By the term "major diameter" it is meant the larger cross dimension of the bottle; and, by the term "minor diameter" it is meant a substantially lesser cross dimension of the bottle than said major diameter. As an example, the bottle may have a body 11a of a diameter on the order of 4–5 inches, a major diameter, and the neck 11c below the ring 11d is a minor diameter on the order of 1–2 inches. The sleeve 16 is placed to an assembled position, as shown on FIG. 3, encircling the body and neck portions of the bottle so that the top edge 16a of the sleeve is at least within about ½ inch of the finish 11e. In the example shown, this locates the edge 16a at about the elevation of the lower margin of the ring 11d of the bottle.

After the bottle and sleeve enter oven 13 (FIG. 1), the chuck is positively driven by a belt or chain drive means controlled to impart rotation to the bottle sufficient such that centrifugal forces bearing on the sleeve in the portions encircling the lesser or minor diameter portions of the bottle area of sufficient magnitude to hold the sleeve erect as the polyolefin is heated and becomes soft and pliable. As the sleeve material reaches its shrink temperature, the initial shrinkage should occur at the body portion 11a of the bottle. The sleeve will be shrunken into contact with the wall of the body of bottle 11 in the middle areas first. This is best accomplished by having the glass bottle preheated to elevated temperature (100°–250° F) and by applying the oven heat so that it is concentrated first around the body portion and next toward the top and bottom edges of the sleeve, i.e. edges 16a and 16b.

Figure 2:
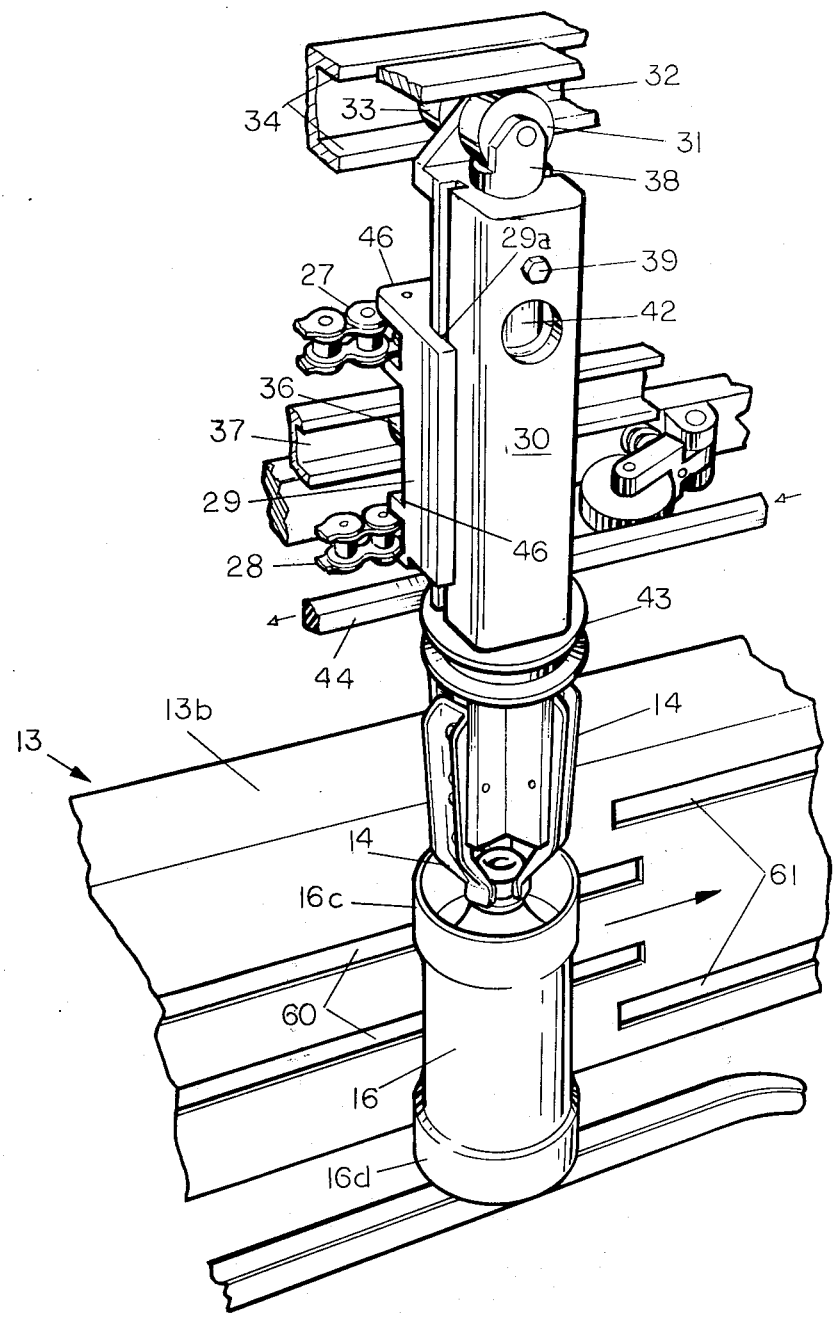
FIG. 2 is a detailed perspective view showing a bottle carried by the bottle conveyor of the apparatus through an oven for heating and shrinking the plastic sleeve thereon.

The rotation of the bottle while traveling in the oven is performed by the apparatus to be described. Referring to FIG. 2, each bottle chuck 14 has its upper cylinder 30 slidably mounted in the slides 29a of bracket 29 for vertical movement of the cylinder under control of the cam roller 33 and cam track 34. The bracket 29 is fastened to upper and lower carriage chains 27 and 28 and includes a roller 36 running in the track 37 extending around the endless path on the machine.

Figure 7:
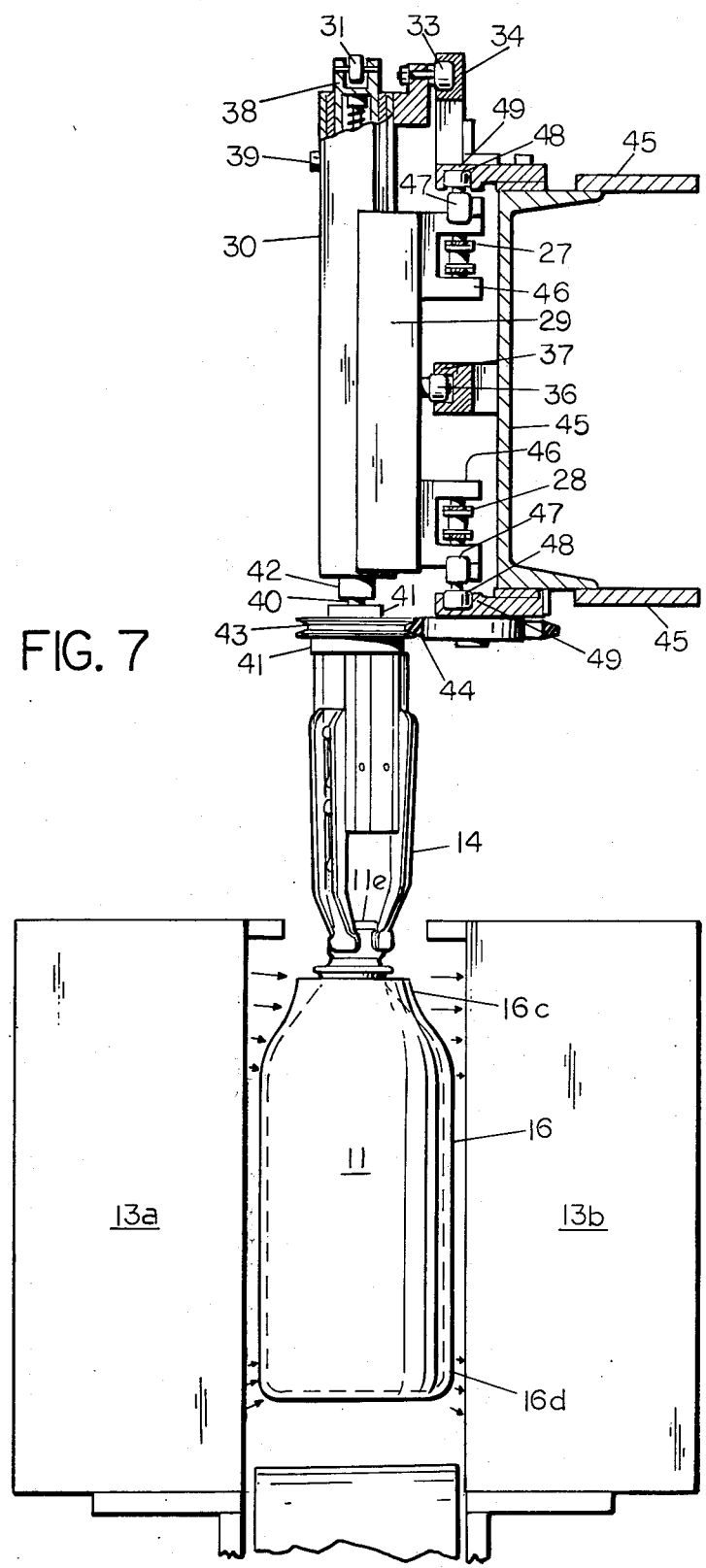
FIG. 7 is an end sectional elevational view of the apparatus shown on FIG. 2.

As seen on FIG. 7, track 37 is fastened to the structural framework 45 of the machine. So that the path of carriage 29 will not wobble, the upper and lower C-shaped bosses 46 for connecting the carriage 29 to chains 27 and 28 each also include a stub shaft 47 and rotatable roller 48. Each roller 48 runs in a similar guide track 49 fastened to the stationary main frame 45. Track 49 follows the path of the chain at least in the portions of the endless path wherein the process is being performed. This structure adds stability to the bottle carriage mechanism. Accordingly, the carriage bracket 29 travels the endless path corresponding to that of chains 27 and 28 and is pulled by the chains connected thereto. The cylinder 30 of each chuck assembly is manipulated vertically along bracket 29 by the cam roller 33, cam 34 for placing the chuck 14 at the proper elevation in the various process steps of handling of the bottle.

As seen on FIG. 7, the chucks jaws 14 are pivoted open and closed about a bottle finish 11e by a yoked piston 38 carrying the cam roller 31. As mentioned before, roller 31 engages a cam 32 controlling the open or close position of the chuck jaws 14. The piston 38 slides vertically in cylinder 30 and is limited by a pin 39 extending through the wall of cylinder 30. The underside of piston 38 engages a chuck rod 40 which extends axially of cylinder 30 and connects to the chuck support collar 41. Collar 41 is pivotally supported on the end of a hollow shaft 42 and the chuck rod 40 extends through the hollow shaft 42. Shaft 42 is mounted in bearings in cylinder 30 such that the shaft and chuck support collar 41 plus the chuck jaws 14 are rotatable. Chuck rod 40 is spring loaded at the underside of piston 38 such that rod 40 is normally extended upwardly in riding the cam roller 31 in contact with the cam 32.

The chuck support collar 41 includes a rotary driven element 43 which in the illustration on the drawings, is a pulley driven by the powered endless member 44 in mesh or driving contact therewith. The member 44, in the illustrated example herein, is a V-belt. The element 43 and member 44 could take the form of a sprocket and link chain, such as a bicycle-type chain. The belt member 44 is driven in a manner to be presently described such that the pulley 43 and the chuck support collar 41 and chuck jaws 14 attached thereto are driven in a controlled speed of rotation during the portion of travel of the sleeve and bottle in the oven wherein the sleeve is undergoing shrinkage.

Referring to FIG. 1, the belt 44 is reeved about an end pulley 50 rotatably mounted on the machine frame and about the drive pulley 51 on the power transmission unit 52. Along the active span of belt 44 there are several freely rotatable back-up rollers 53 which extend over the span of travel for the chucks while in the oven. The back-up rollers 53 may be located on about a 6-inch spacing of their centers along this span of the belt. The back-up rollers 53 are spring loaded against the belt, such as is illustrated on FIG. 2, which hold the belt into the path of the pulleys 43 on each of the chucks and assure driving engagement of the belt 44 with the pulleys 43. An end idler pulley 54 guides the belt over the drive pulley 51. An adjustable take-up pulley 55 is rotatably mounted on an adjustable means (not shown) on the back side of the belt run to maintain the belt in a taut condition.

Transmission unit 52 is a reversible, variable speed type operated by an electric motor 56 connected to the transmission input sprocket 57 by a chain drive 58. Transmission 52 is preferably operated to run the belt in a direction counter to the direction of travel of the chucks through oven 13, that is, on FIG. 1 in a clockwise direction (the carriage chains 27, 28 are being driven in a counter clockwise direction). In this fashion, the line speed of the chucks through the oven will be additive with the speed of belt 44 and their sum will provide the rotation to the chucks in the oven for the purposes of the invention. The running speed of the belt 44 may be varied through the motor and transmission to achieve the desired RPM of the chucks as they travel through the oven.

The path of belt 44 will be controlled by the series of back-up rollers 53 such that the belt 44 will engage each of the pulleys 43 approximately at the time the bottle carried by the chuck enters the front end of oven 13. At this point, the elevation of the chuck cylinders 30 is established by cam track 34 such that each of the pulleys 43 will mesh with belt 44. The prescribed rotational speed of the chuck and bottle, determined by line speed of conveyor 12 and running speed of belt 44, will be achieved in the forward end of the oven atmosphere for size of bottle and dimensions and composition of the cylindrical form of sleeve thereon. As the bottle passes to and in the oven, the lower edge 16b of the sleeve will be guided on water cooled bar 35 so as to maintain proper height elevation of the sleeve on the bottle.

Referring now to the sequence of FIGS. 3-6, the method of shrinking the polyolefin type of sleeve on the bottle is illustrated. As seen on FIG. 3, the sleeve is moved telescopically along the central axis of bottle 11 by the UP motion of stripper element 19 so as to transfer the cylindrical sleeve 16 from the mandrel 17 and into the assembled position. The bottle and sleeve then move into the oven and the sleeve is exposed to the heating needed for shrinking. In the use of polyethylene sleeves, the operating temperature of the oven is in the range 600°–900° F under production conditions of approximately 100–250 BPM.

Figure 5:
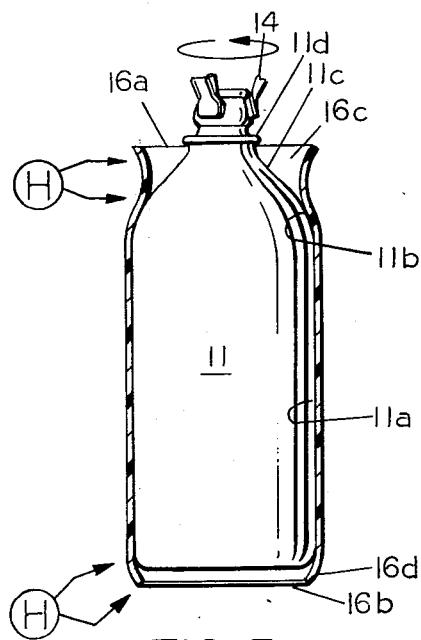
FIG. 5 is the second in a sequence of end views showing the bottle and sleeve at a later stage during the heating in the oven.

In the oven 13, the heat is supplied by hot air or infra-red burners and directed onto the bottle as it passes along the oven in a pattern indicated on FIGS. 4 and 5. The heat pattern is indicated thereon by the encircled H legend plus the arrows. The forward section of the oven directs the heat as shown on FIG. 4 toward the body section 11a of the bottle. After polyolefin material is being elevated in temperature to a degree necessary for shrinking, the sleeve becomes limp. However, by this time the bottle and sleeve are brought up to a rotational speed to apply centrifugal force to the upper and lower segments 16c and 16d, respectively, of the sleeve material which force maintains the sleeve erect and these unsupported end segments 16c and 16d are billowed outwardly as shown on FIG. 3. In the example given, such as a glass bottle preheated to 110°–125° F having a body diameter at 11a of 4–5 inches and a neck diameter at 11c of 1–2 inches, and using a foamed polyethylene matrix with solid polyethylene exterior skin of 1–3 mils thickness, the composite thickness being 14–15 mils, and wherein the circumferential (M.D.) shrink factor or orientation is 60–80% and the height (C.D.) shrink factor is 0–15%, the bottle rotation of 250–275 RPM produces a centrifugal force sufficient to achieve the billowed effect of the sleeve segments 16c and 16d while the intermediate segment is shrinking onto the bottle. As the bottle passes into the next adjacent part of oven 13, the heat is applied or directed onto the bottle in accordance with the pattern shown on FIG. 5 (represented by the encircled H legend and arrows), wherein heat is now concentrated against the upper segment 16c and the lower segment 16d of the sleeve. Rotation of the bottle continues while these segments achieve temperature for shrinking and undergo the contraction until the material thereof shrinks snugly along the wall of the bottle at the neck section 11c and over the heel section 11h and onto the annular bearing section of the bottom wall 11g.

Figure 6:
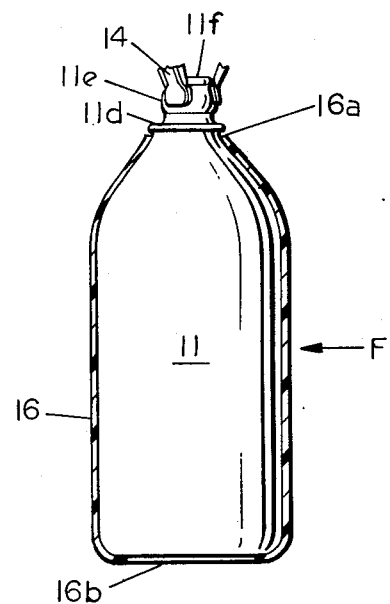
FIG. 6 is the third in a sequence of end views showing the final plastic wrap on the bottle.

After the sleeve has finally achieved the full shrunken condition, the product of the bottle and sleeve is shown on FIG. 6. The top marginal edge 16a of the sleeve has now snugly encircled the neck just under the ring 11d; whereas, the bottom marginal edge 16b has curled under the bottom of the bottle and encircled the heel radius portion 11h. The top and bottom margins of the wrap are free of wavy and wrinkled appearance. The sleeve wrapped bottle (indicated as F on FIGS. 1 and 6) has a relatively tough, cushioned covering on the exterior surface that is in a snug fitting, conforming engagement substantially encapsulating the bottle. Only the carrying ring 11d, finish portion 11e and central area of bottom 11g are left uncovered. The need for exposure of these surfaces in the use of the bottle should be readily apparent.

At the point of production illustrated on FIG. 6, the wrapped bottle F exits the oven and rotation of the chuck and bottle ceases by a disengagement of the belt 44 with pulley 43, which will occur naturally by the diverging path of belt 44 between the last back-up roller 53 and the guide roller 54 from engaging the pulley 43 of the chucks traveling along the path prescribed by the carriage chains 27 and 28. As shown schematically by the line and arrow path on FIG. 1, each chuck cylinder 30 lowers the chuck jaws 14 by sliding downwardly along the carriage bracket under control of roller 33 which is following the dip in cam 34. The cam 34 lowers the bottle such that it is nearly engaging the exit conveyor 59. At this time, the roller 31 controlling the opening-closing movement of chuck jaws 14 encounters the sharp dip in cam 32 opening the jaws and releasing the bottle product F to the exit conveyor 59. Thereafter, the chuck mechanism and carriage conveyor repeat the cycle upon passing the loading point over the bottle infeed conveyor 20.

Referring again to FIG. 2, the apparatus illustrates the travel of the bottle in the forward section of oven 13 wherein the heat is being directed predominantly toward the body section 11a of the bottle. The one half portion of the oven 13 shown represents the exhaust half side 13b of the oven in which the central louver controlled slots 60 control the flow of heat across the oven into the intermediate zone of the bottle and along the path of the bottle thereat. In this section, the central louvers of slots 60 control major flow of the heated air across the intermediate region of the bottle path. By the same principle, the next stages of the oven will include top and bottom bottle zone exhaust slots 61 that direct the heated air principally toward heating the top and bottom regions of the bottle in its path through the aft section of the oven. Together these serially arranged oven sections apply the heat for shrinking the sleeve in accordance with the patterns described and illustrated on FIGS. 4 and 5.

As shown on FIG. 7, the bottle is moving toward the observer and the heating is applied in this cross-sectional view from the left hand one half of the heating apparatus 13a housing burners (not shown) across the top and bottom zones over the upper and lower billowed portions 16c and 16d of the sleeve and into the exhaust one half of the oven 13b, just described.

As mentioned earlier, the sleeves may be made from sheet stock of a pre-oriented polyolefin or copolymers of olefins, for example polyethylene of either high density or low density grade, or laminates of polyolefins, e.g. polyethylene foam layer and polyethylene film. The property of these materials in contraction (heat shrinking) is a first pliable or limp state during which the sheet of the sleeve tends to sag, slump or fold easily, followed by a shrinkage reaction. This invention deals effectively with the propensity of the material of the type described to slump or sag in the initial stages of heating by improving or making it feasible for the material of the sleeve to shrink evenly over the bottle surface when it reaches a temperature to do so and without wrinkles, such that the bottle is covered up to the finish end, along the neck and on the body to the bottom annular bearing surface.

The preheating of the glass bottle, indicated herein as beneficial in the process, is accomplished just prior to the telescopic assembly of the cylindrical sleeves thereover. This may be done in an oven placed along the path of the conveyor after the bottle loading station, or hot bottles from the manufacturing line producing the bottles may be presented to the loading station at proper elevated temperature. The hot glass or heat in the bottle glass is especially beneficial in the shrinkage of the foam sheet materials in sleeve form over the bottle surface.

Having described a preferred embodiment of the invention and illustrated in connection therewith a preferred form of apparatus for carrying out the method of the invention, it should be understood that further modifications may be resorted to without departing from the spirit of the invention and scope of the appended claims.

What is claimed is:

1. An apparatus for shrinking a plastic sleeve wrap on a container comprising a conveyor operable for travel in a closed horizontal path, a plurality of spaced apart chucks depending with their vertical axes normal to said path and rotatably mounted on said conveyor for rotation about said axes, each said chuck including an axially rotatable belt driven member, the chucks being moved through a container loading station along said conveyor path and operated responsive to movement through said station for grasping containers and suspending them vertically in an upright position for movement and rotation in said path, a sleeve assembly station along said conveyor path, means for axially assembling a sleeve of a heat shrinkable plastic material on each said container responsive to movement through said sleeve assembling station, an elongated oven along said conveyor path spaced beyond said sleeve assembling station and through which said containers with sleeves are conveyed for shrinking the latter on the former, a movable driving member comprising and endless belt means means supporting said belt means along the conveyor path for engaging said rotatable member of the chucks during the span of movement of the containers while in the oven, and including a variable speed drive means operatively connected to the belt means for running the latter at a predetermined speed in one direction along said oven span, wherein said belt means engages the said rotatable member of each of the moving chucks driving them at a rotary speed of at least 100 RPM.

2. An apparatus for shrinking a plastic wrap on the exterior of glass bottles each having a neck finish, neck, and enlarged body and bottom end portions which comprises a plurality of said bottles having sleeves of heat shrinkable polyolefin plastic carried thereon, said sleeves being of a height substantially the height of said bottles, plural bottle chucks holding said plurality of bottles at their neck finish, a conveyor having said chucks spaced therealong and supporting said bottles at one axial end in a vertical depending position, said conveyor being guided through a horizontal path, an elongated oven means disposed along said conveyor path such that bottles and sleeves thereon pass through the oven means during movement of the conveyor in said path, said oven means furnishing heat for shrinking the plastic sleeves in surface engaging conforming relationship on said bottles, the improvement therein comprising a pulley connected to each of the chucks for rotating the bottles about a central vertical axis, an endless, driving belt, means on the apparatus supporting the belt for movement in a closed path extending lengthwise and along the oven means, and a variable speed drive means connected for operating the belt at a predetermined linear speed, said belt engaging each of the pulleys of the chucks and rotating them while at said speed in the range of 100-275 RPM during movement of the chucks by the conveyor and while the sleeves are undergoing said heating and shrinking in the oven means.

3. The apparatus of claim 2, in which the means supporting the belt lengthwise along the oven means comprises a plurality of rotatable back-up pulleys for running in engagement with the belt and each of the pulleys rotatably supported by means on the apparatus at spaced intervals substantially along the span of said belt extending lengthwise and along the oven means, said pulleys in engagement with said belt positively assuring driving contact of said belt with each of the said rotatable chuck pulleys during travel in the oven.

4. The apparatus of claim 2, in which the variable speed drive means comprises a variable speed transmission having a driver element in running engagement with the belt and a power input shaft, an electric motor, and means connecting the motor to said input shaft.

5. The apparatus of claim 4, in which the motor drives said transmission for running said belt in a direction counter to the direction of movement of the conveyor in said oven means.

6. Apparatus for heat treatment of an article comprising an elongated oven for heating articles moved through it lengthwise, a conveyor mounted for movement the length of the oven, the conveyor including plural spaced chucks holding the articles in a vertical, upright position, the articles having shrinkable polyolefin plastic sleeves thereon extending telescopically over the exterior surface thereof, the oven heating the total surface area of the sleeve for shrinking the latter, a belt, a pulley on each of the chucks for rotating the latter about a vertical axis upon engagement with said belt.

means supporting the belt lengthwise along the oven and engaging the pulleys of the chucks responsive to being conveyed along the oven, power means in running engagement with the belt for driving it in one direction at a predetermined velocity, thereby rotating the chucks and articles held thereby at RPM for producing a centrifugal force on the sleeves during movement of the latter through the oven sufficient for billowing them outwardly during the heat treatment of said sleeves and for heat shrinking them uniformly and in conforming relationship over the outer surface of the article.

7. The apparatus of claim 6, wherein the belt is driven by said power means in a direction opposite the direction of travel of the conveyor.

8. The apparatus of claim 6, in which the rotation of the chucks and articles is in the range 100-275 RPM.

9. The apparatus of claim 6 in which the belt is characterized as a V-belt and said pulleys of the chucks are drivable by said V-belt.

* * * * *

UNITED STATES PATENT AND TRADEMARK OFFICE
CERTIFICATE OF CORRECTION

PATENT NO. : 4,072,553

DATED : February 7, 1978

INVENTOR(S) : Frederick Williams Braker, Russell William Heckman, George Allen Nickey, Terry Clair Potter It is certified that error appears in the above-identified patent and that said Letters Patent are hereby corrected as shown below:

Col. 2, line 40, "e.q." should be -- e.g. --.

Signed and Sealed this

Nineteenth Day of September 1978

[SEAL]

Attest:

RUTH C. MASON
*Attesting Officer*

DONALD W. BANNER
*Commissioner of Patents and Trademarks*